Nov. 1, 1960 S. FREDERIC GUGGENHEIM ET AL 2,958,101
POTENTIOMETER STRUCTURE AND METHOD OF MAKING SAME
Filed Dec. 2, 1958

INVENTOR.
S FREDERIC GUGGENHEIM
ARNOLD S. LOUIS
BY

*Leonard H. King*

2,958,101
Patented Nov. 1, 1960

2,958,101

POTENTIOMETER STRUCTURE AND METHOD OF MAKING SAME

S. Frederic Guggenheim, 604 Cumberland Ave., Teaneck, N.J., and Arnold S. Louis, Riverdale, N.Y. (87 Southgate Ave., Hastings on Hudson, N.Y.)

Filed Dec. 2, 1958, Ser. No. 777,637

10 Claims. (Cl. 18—36)

This invention relates to a method for accurately insert molding hollow metal rivets in molded plastic articles, and particularly, but not necessarily limited thereto, to a unitary structure adapted to be employed with potentiometers and the like wherein a resistance element and terminal rivets therefor are formed on an insulator plastic base.

Rivets are frequently employed to effect electrical connection between various electrically conductive elements of a circuit. For example, in the employment of conventional printed circuits, a commonly employed circuit forming technique involves the use of a plastic insulator base to which is laminated a metal foil. By means of one of the common printed circuit techniques, metal foil is removed, as by etching or sandblasting, to leave a conductive foil pattern of the desired circuit configuration. At various terminal points holes are punched, conductive leads are passed through the holes, and soldered directly to the foil. For more critical applications, a hollow rivet is passed through the hole and then spun over to make contact with the foil. Connections of this type are subject to certain types of failure, as for example, poor contact resulting from the difference in the temperature coefficient of expansion of the insulator base and the metal rivet. The difference in expansion can result in destroying the contact between the rivet and the metal foil conductive element. Another problem which arises is the need for accurately positioning the rivet so as to contact the foil pattern. Instead of inserting the rivet into a preformed sheet, attempts have been made to insert mold the rivet at the time the insulator sheet is molded. In the insert molding of rivets the high molding pressures and flow of the plastic can readily cause the insert to shift position by a few thousandths of an inch which would result in many cases in the rejection of a unit because of failure to meet voltage breakdown tests or as will be better understood, from the detailed description given hereinafter, from failure of the insert to properly contact its conductive member. Simple insert molding does not eliminate the difficulties arising from differences in the coefficient of expansion between the metal insert and the plastic base. Further, such inserts have been known to loosen as the result of the difference in the temperature coefficient of expansion and mechanical forces to which it is subject so as to break continuity of connection. Potentiometer devices are frequently extremely compact mechanisms intended for use in rigorous applications such as guided missiles and the like. In designing a potentiometer, clearances between components must be kept to a minimum, from the viewpoint of size conservation, and yet the designer is faced with the problem of maintaining adequate electrical insulation between elements.

It is to be appreciated that it is contemplated that this invention may be employed in the manufacture of precision potentiometers whose cost may be in the hundreds of dollars rather than in the order of a few cents as in the case of common volume controls, and the like, so that the rejection of even a single unit represents a costly and serious problem to the manufacturer and ultimately to the consumer.

The device of the present invention is particularly adapted to be used in the manufacture of potentiometers, where it is desired to position a metal terminal rivet in spaced relation to a resistance and/or conductive element, the rivet forming part of the circuit connections to the resistance and conductive elements. It is also especially adapted for co-molding procedures where an electrically conductive resistance and/or conductive element is formed upon a molded plastic insulator base, and simultaneously the rivet is positioned in this insulator base to form electrical connection with the conductive or resistance strip.

Thus it is contemplated to form a potentiometer assembly simply and rapidly, providing high accuracy in spacing the components in relation to each other, at a low cost and adapted to be employed in rapid, mass production manufacturing procedures.

It is therefore, an object of the present invention to provide means for the accurate positioning of metallic inserts in a plastic body during molding operations.

A further object of the present invention is to provide a simple low-cost co-molding procedure wherein an insulator plastic base may be provided with a resistive and/or conductive plastic element together with a precisely located metallic terminal rivet in a single molding operation.

Yet a further object of the present invention is to provide an improved hollow rivet that is easily machined.

It is yet a further object of the present invention to provide an improved precision potentiometer element, the assembly including molded components having metallic rivets therein.

Yet another object of the present invention is to provide a method for accurately positioning metallic inserts in plastic bodies.

These and other objects and advantages of the present invention will be apparent from the following description and accompanying drawings, and the claims appended thereto.

Figure 1:
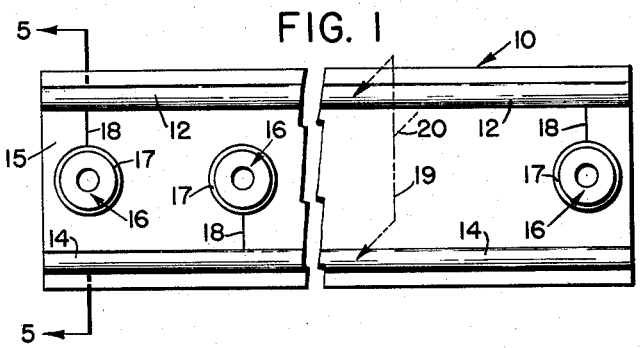
Figure 1 is a plan view of a potentiometer element formed in accordance with this invention.

In Figure 1 there is shown an assembly 10 for a potentiometer including an insulator plastic base plate 15, having disposed thereon a resistance track 12 and a conductive track 14 which serves as a "take-off." Co-molded with the tracks are metallic inserts 16, conductive ring 17, defining a connection area, and conductive leads 18. The insert 16 is shown with a portion staked over conductive ring 17. Leads 18 serve to connect tracks 12 and 14 with conductive rings 17. Insert 16 may be threaded to receive a binding screw for securing conventional wire conductors to the insert or the wire conductor may be inserted into the bore of the insert and soldered in place.

The resistance element 12 is shown provided with the conventional fixed end terminals, it being understood that, additional taps may be provided in like fashion for multi-tap type potentiometers. A wiper assembly 19, shown here schematically, is moved by an actuating arm 20 to provide electrical connection between the resistance element and the conductive track 14. The entire assembly is then encased in suitable hardware which is well-known to the art and is therefore not disclosed herein.

Figure 2:
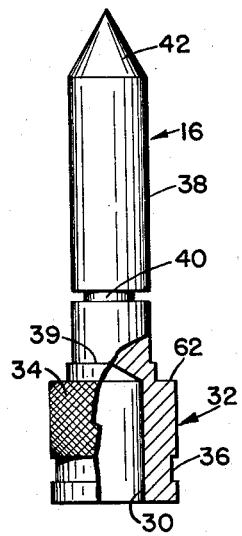
Figure 2 is a partially sectioned elevation view of the co-molded metal insert employed in this invention prior to forming.

Figure 2 illustrates a preferred form for the metallic insert 16. Body 32 is provided with a knurled portion 34, a reduced diameter portion 36 and an axial bore 30. A cylindrical locating pin 38 is located coaxially with respect to body 32 and is axially spaced therefrom by undercut connecting member 40. It will be noted from the drawings that bore 30 has a larger diameter than undercut connecting portion 40, the purpose for which will hereinafter be described. Insert 16 is preferably provided with a conical tip 42.

Figure 3:
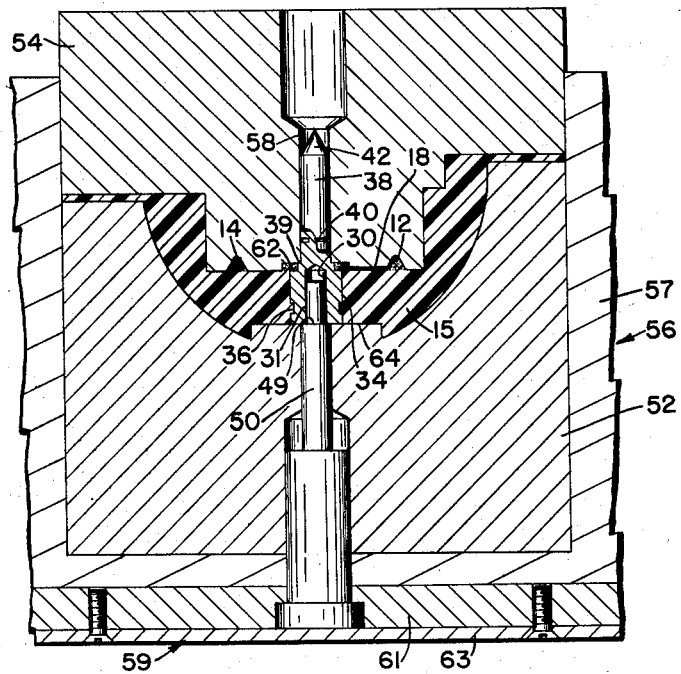
Figure 3 is a simplified view in cross-section of the mold employed.

As shown in Figure 3, the molding operation consists of filling grooves in the upper mold force, corresponding to members 12, 14, 17 and 18, with conductive plastic molding powders of appropriate conductivity. This is to say, the resistive track 12 will be of a less conductive material than take-off track 14, connectors 18 and ring 17. The material filled into the groove may be compacted so that it is retained when the mold member is inverted. The lower half 52 of mold 56 is then inserted into mold collar 57 and positioned over base plate 59. Base plate 59 consists of two members 61 and 63 fastened together so as to rigidly clamp locating pins 50 in an upright position with the shoulder portion 49 of the pin flush with the cavity forming face of mold portion 52. Insert 16 is then seated on shoulder 49 of pin 50, with the bore 30 engaged by portion 31 to secure one end of the insert. The mold cavity is then charged with insulator plastic powder and the upper mold half 54 positoned, in contact with shoulder 39 of insert 16, over the lower mold half 52 to define a mold cavity.

An important advantage of this invention is the prevention of the movement of insert 16 by plastic flowing under pressure during molding. This is achieved by the engagement of portion 38 in bore 58 so as to secure one end of the insert 16 while the other end is secured by locating pin 50 thereby insuring against any movement resulting from the flow of plastic during the molding operation.

It has been pointed out that the insert is accurately positioned relative to the resistance track in the horizontal plane. With respect to the vertical plane, it is to be noted that insert 16 is provided with shoulder 39 which seats against the lower face of mold force 54 so as to positively and accurately locate the insert 16.

Figure 4:
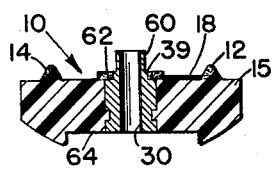
Figure 4 is a sectional view taken in elevation through a rivet after removal of the positioning means but prior to a staking operation.

It can be seen in the drawings that undercut 40 is spaced above the plastic body during the molding process. After the completed unit is removed from the mold, the bore 30 of metallic insert 16 is extended past undercut connecting portion 40 by drilling said bore 30 as a pilot hole. A drill substantially the size of bore 30 is employed. As shown in Figure 4, this will effectively sever cylinder portion 38 from body portion 32, since bore 30 has a larger diameter than undercut connecting portion 40. A tapping operation may be applied to bore 30 of metallic insert 16 if it is desired to use a screw type terminal.

Figure 5:
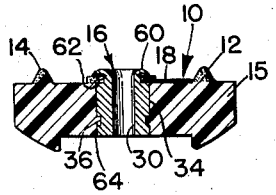
Figure 5 is a sectional view taken along line 5—5 of Figure 1 illustrating the metallic insert formed as a hollow rivet.

The molded unit now has a hollow rivet ready for forming. The hollow extension 60 resulting from the drilling operation may be staked over by conventional means to obtain the configuration shown in Figure 5. Prior to staking a washer may be slipped over hollow extension 60 to provide better electrical contact.

Conneciton to an external circuit is made by a wire (not shown) which is laid into groove 64. The exposed end of the wire is inserted into the bore 30 of rivet 16 and then solder-potted. An epoxy resin is then buttered over the groove 64 to mechanically clamp the wire at the solder joint. This technique provides a high degree of reliability despite the very close space limitation.

In the conventional riveting operation the entire thickness of the plastic base is clamped between the head and the staked over tail of the rivet. An important advantage of this invention is that the plastic base is secured in two closely spaced positions, one being defined by groove 36 and the other by shoulder 62 and the staked over tail 60 of insert 16. Accordingly, the difference in the temperature coefficient of expansion between the metallic insert and the plastic base results in a very small physical change in dimension under extremes of temperature and provides a much higher degree of reliability than prior art means.

The insert molding of the rivet makes feasible the used of knurled portion 34 as opposed to the use of a clearance hole employed in conventional riveting operations. The knurled portion 34 then provides positive locking of the insert against rotation and does not depend solely upon staking.

The invention provides a number of important manufacturing advances. The removable tip of the rivet provides definite positioning in the mold. The fact that the rivet is secured at both ends to prevent movement resulting from the flow of the plastic during the molding operation greatly improves the production reproducibility over prior approaches. The cone point 42 guides the rivet into position when the upper force is lowered into position facilitating molding operation.

By way of illustration there has been disclosed the manufacture of a rectilinear potentiometer element, it being understood that the invention may likewise be applied to the production of rotational or still other devices.

The charging of the mold with the insulator molding powder is normally carried out prior to enclosure of the cavity with the upper mold force. The molding material may also be introduced after closure of the mold as for example, by such techniques as are employed in transfer molding.

While there has been shown a diamond cut knurl on body 32 (Figure 2) it will be obvious to those skilled in the art that the key formed by groove 36 will prevent any axial movement and any other configuration of knurl or even a longitudinally disposed key will prevent any rotational movement when the insert is finally encapsulated.

Having thus disclosed the best embodiment of the invention presently contemplated,

What is claimed is:

1. A metallic insert for a molded article of manufacture comprising a locator pin portion, a keyed body portion and a necked down connecting portion joining one end of said body portion to one end of said pin portion, said body portion being provided with an axial bore greater than the diameter of said necked down connecting portion, whereby when said bore is extended through said necked down connecting portion, said pin portion separates from said body portion.

2. The device of claim 1 wherein said second portion is adapted to be staked over.

3. The process of molding a plastic body having accurately positioned insert members, wherein said members comprise a locator pin portion, a keyed body portion, and an integrally formed necked down connecting portion joining said pin portion to said body at one end thereof, said body portion being provided with a bore for receiving a positioning pin extending inwardly at its other end; comprising the steps of positioning said insert members on a positioning pin extending outwardly of a first mold portion; positioning a second mold portion, provided with a recess adapted to receive said locator pin, in juxtaposition with said first mold portion to define a mold cavity; charging said mold cavity with an insulator plastic molding composition; applying sufficient heat and pressure to cause said plastic molding composition to flow and encapsulate said body portion; cooling said resulting molded body; removing said molded body from said cavity; and extending said body portion bore beyond said connecting portion thereby severing said locator pin portion from said body portion.

4. The process of claim 3 wherein said bore is extended by drilling.

5. The process of forming a potentiometer element including the steps of filling of at least one groove in a mold face with a moldable composition adapted to form a resistance element when molded; filling channels and a recess defining a connection area contiguous to said channels, said channels intersecting said groove, with a composition adapted to provide a conductive path to the resistance element; positioning insert members through said connection areas, said insert members comprising a locator pin portion, a keyed body portion and an integrally formed necked down connecting portion joining said pin portion to said body portion at one end thereof, said body portion being provided with a bore for receiving a positioning pin extending inwardly at its other end; positioning said insert members on positioning pins extending outwardly of a first mold portion; positioning a second mold portion, provided with bores adapted to receive said locator pin portions, in juxtaposition with said first mold portion to define a mold cavity; charging said mold cavity with insulator plastic molding composition; applying sufficient heat and pressure to cause said molding composition to flow and encapsulate said body portion; cooling said resulting molded body; removing said molded body from said mold cavity; and extending said body portion bore beyond said connecting portion thereby severing said locator pin portion from said body portion.

6. The process of claim 5 wherein said bore is extended by drilling.

7. The process of claim 5 including the step of staking over a portion of said body portion extending from said molded body against said connection area.

8. The process of molding a plastic body having accurately positioned insert members, wherein said members comprise a locator pin portion, a keyed body portion, and an integrally formed necked down connecting portion joining said pin portion to said body at one end thereof, said body portion being provided with a bore for receiving a positioning pin extending inwardly at its other end; comprising the steps of positioning said insert members on a positioning pin extending outwardly of a first mold portion; introducing insulator plastic molding composition; positioning a second mold portion, provided with a recess adapted to receive said locator pin, in juxtaposition with said first mold portion to define a mold cavity; applying sufficient heat and pressure to cause said plastic molding composition to flow and encapsulate said body portion; cooling said resulting molded body; removing said molded body from said cavity; and extending said body portion bore beyond said connecting portion thereby severing said locator pin portion from said body portion.

9. The process of forming a potentiometer element utilizing a mold member having a groove adapted to form a resistance element, recesses adapted to form connection areas, and channels connecting said recesses and said groove adapted to form connecting means, including the steps of filling said groove with a moldable composition adapted to form a resistance element when molded; filling said recesses and channels, with a composition adapted to provide a conductive path to the resulting resistance element; positioning insert members through said connection areas, said insert members comprising a locator pin portion, a keyed body portion and an integrally formed necked down connection portion joining said pin portion to said body portion at one end thereof, said body portion being provided with a bore for receiving a positioning pin extending inwardly at its other end; positioning said insert members on positioning pins extending outwardly of a first mold portion; introducing insulator plastic molding composition; positioning a second mold portion, provided with bores adapted to receive said locator pin portions, in juxtaposition with said first mold portion to define a mold cavity; applying sufficient heat and pressure to cause said molding composition to flow and encapsulate said body portion; cooling said resulting molded body; removing said molded body from said mold cavity; and extending said body portion bore beyond said connecting portion thereby severing said locator pin portion from said body portion.

10. The process of forming a potentiometer element comprising filling at least one groove in the internal face of a first mold portion with a moldable composition adapted to form a resistance element when molded, filling channels and recesses defining connection areas contiguous to said channels with said channels intersecting said groove, with a composition adapted to provide a conductive path to the resistance element; positioning insert members on a positioning pin extending outwardly of a second mold portion, said insert members comprising a locator pin portion, a keyed body portion and an integrally formed necked-down connecting portion joining said pin portion to said body portion at one end thereof, said body portion being provided with a bore for receiving a positioning pin extending inwardly at its other end; inserting said second mold portion in a retaining member to define an open mold cavity; charging said mold cavity with an insulating plastic molding composition; positioning said first mold portion in juxtaposition with said second mold portion to close said mold cavity with said locator pin portions passing through holes centered in said connection areas to restrain said locator pins; applying sufficient heat and pressure to cause said plastic molding composition to flow and encapsulate said body portion; cooling said resulting molded body; removing said molded body from said cavity; and extending said body portion bore beyond said connecting portion thereby severing said locator pin portion from said body portion.

References Cited in the file of this patent
UNITED STATES PATENTS 2,222,755     Watson _____ Nov. 26, 1940

FOREIGN PATENTS 690,252     Great Britain _____ Apr. 15, 1953